(12) United States Patent
Shin et al.

(10) Patent No.: US 10,162,499 B2
(45) Date of Patent: Dec. 25, 2018

(54) CONTENT PLAYBACK APPARATUS AND CONTENT PLAYING METHOD

(71) Applicant: PIXTREE TECHNOLOGIES, INC., Seoul (KR)

(72) Inventors: Jae Seob Shin, Seoul (KR); Sun Gul Ryoo, Seoul (KR); Se Hoon Son, Seoul (KR); Kwang Woo Park, Seoul (KR); In Suk Hwang, Seoul (KR)

(73) Assignees: PIXTREE TECHNOLOGIES, INC., Seoul (KR); SK TELECOM CO., LTD., Seoul (KR)

( * ) Notice: Subject to any disclaimer, the term of this patent is extended or adjusted under 35 U.S.C. 154(b) by 232 days.

(21) Appl. No.: 14/915,569

(22) PCT Filed: Aug. 5, 2014

(86) PCT No.: PCT/KR2014/007199
§ 371 (c)(1),
(2) Date: Feb. 29, 2016

(87) PCT Pub. No.: WO2015/030383
PCT Pub. Date: Mar. 5, 2015

(65) Prior Publication Data
US 2016/0216870 A1    Jul. 28, 2016

(30) Foreign Application Priority Data

Aug. 29, 2013 (KR) .......... 10-2013-0103252

(51) Int. Cl.
*G06F 3/0484* (2013.01)
*G06F 3/0486* (2013.01)
(Continued)

(52) U.S. Cl.
CPC ........ *G06F 3/04845* (2013.01); *G06F 3/0482* (2013.01); *G06F 3/0484* (2013.01);
(Continued)

(58) Field of Classification Search
None
See application file for complete search history.

(56) References Cited

U.S. PATENT DOCUMENTS 8,902,259 B1 * 12/2014 Zheng .................... G09G 5/373
                                                  345/661
9,030,419 B1 *  5/2015 Freed .................... G06F 3/0416
                                                  345/156
(Continued)

FOREIGN PATENT DOCUMENTS

JP     2013143001 A      7/2013
KR  10-2012-0116996 A   10/2012
(Continued)

OTHER PUBLICATIONS

Japanese Office Action dated May 24, 2017 in connection with the counterpart Japanese Patent Application No. 2016-538835.
(Continued)

*Primary Examiner* — Christopher J Fibbi
(74) *Attorney, Agent, or Firm* — Hauptman Ham, LLP

(57) ABSTRACT

A content playback apparatus comprises a touch screen, a memory and a processor. The touch screen is configured to play back a plurality of contents and to detect a touch input for the contents. The memory is configured to store instructions to control a playback of the contents. The processor is configured to control the playback of the contents according to the instructions. The instructions include a display instruction for displaying playbacks of the plurality of contents in a predetermined size, a move instruction for moving, among the plurality of contents, a content according to the touch input, and a magnification instruction for, in response to said moving, magnifying a playback size of the moved content according to the touch input and displaying (Continued)

a playback of the content on the touch screen at the magnified playback size of the content.

12 Claims, 4 Drawing Sheets

(51) Int. Cl.
*G06F 3/0488* (2013.01)
*G06F 3/0482* (2013.01)

(52) U.S. Cl.
CPC ........ *G06F 3/0486* (2013.01); *G06F 3/04847* (2013.01); *G06F 3/04883* (2013.01); *G06F 2203/04806* (2013.01)

(56) References Cited

U.S. PATENT DOCUMENTS

| 2007/0180400 | A1* | 8/2007 | Zotov ................. G06F 3/04883 715/788 |
| 2008/0222690 | A1* | 9/2008 | Kim ................... H04N 5/44543 725/110 |
| 2009/0160793 | A1 | 6/2009 | Rekimoto |
| 2009/0300554 | A1 | 12/2009 | Kallinen |
| 2010/0017710 | A1 | 1/2010 | Kim et al. |
| 2011/0050588 | A1* | 3/2011 | Li .......................... G06F 3/0414 345/173 |
| 2011/0119624 | A1 | 5/2011 | Coldefy et al. |
| 2012/0274662 | A1 | 11/2012 | Kim et al. |
| 2013/0176245 | A1* | 7/2013 | Kwon ................... G06F 3/0488 345/173 |
| 2014/0245148 | A1* | 8/2014 | Silva .................. H04N 5/44591 715/719 |
| 2016/0378331 | A1* | 12/2016 | Hinckley ............ G06F 3/04883 715/863 |

FOREIGN PATENT DOCUMENTS

| KR | 10-2012-0133365 A | 12/2012 |
| KR | 10-2013-0067887 A | 6/2013 |
| WO | 2013/035725 A1 | 3/2013 |
| WO | 2013/074207 A1 | 5/2013 |

OTHER PUBLICATIONS

Extended European search report dated Apr. 19, 2017 in connection with the European Patent Application No. 14840926.1-1879.
International Search Report for PCT/KR2014/007199 dated Sep. 30, 2014.

* cited by examiner

CONTENT PLAYBACK APPARATUS AND CONTENT PLAYING METHOD

CROSS-REFERENCE TO RELATED APPLICATION

The present application is a continuation of International Patent Application No. PCT/KR2014/007199, filed Aug. 5, 2014, which is based on, and claims priority to Korean Patent Application No. 10-2013-0103252, filed on Aug. 29, 2013. The disclosures of above-listed applications are hereby incorporated by reference herein in their entirely.

TECHNICAL FIELD

The present disclosure relates to an apparatus and method for playing back a plurality of contents.

BACKGROUND

In general, mobile devices, such as smartphones and the like, play back one of contents, such as videos and the like, at a time due to limited performance. However, the recent change in decoding of contents such as videos not only from software but also from hardware allows a plurality of contents to be played back at a time in mobile devices.

However, a user interface for playback of the plurality of contents is unavailable, which makes it difficult to playback the plurality of contents in a mobile device at a time.

SUMMARY

In some embodiments, a content playback apparatus comprises a touch screen, a memory and a processor. The touch screen is configured to play back a plurality of contents and to detect a touch input for the contents. The memory is configured to store instructions to control a playback of the contents. The processor is configured to control the playback of the contents according to the instructions. The instructions include a display instruction for displaying playbacks of the plurality of contents in a predetermined size, a move instruction for moving, among the plurality of contents, a content according to the touch input, and a magnification instruction for, in response to said moving, magnifying a playback size of the moved content according to the touch input and displaying a playback of the content on the touch screen at the magnified playback size of the content.

In some embodiments, a method of playing back content, by a content playback apparatus comprising a processor and a touch screen, the method comprises displaying playbacks of a plurality of contents in a predetermined size, moving, among the plurality of contents, a content according to a touch input, magnifying a playback size of the moved content according to the touch input, and displaying a playback of the content on the touch screen at the magnified playback size of the content.

In some embodiments, a method of playing back content, by a content playback apparatus comprising a processor and a touch screen comprising a first area and a second area, the method comprises displaying playbacks of a plurality of contents in a predetermined size on the first area of the touch screen, moving, among the plurality of contents, a content according to a touch input from the first area to the second area, and magnifying a playback size of the moved content according to the touch input, displaying a playback of the content on the second area of the touch screen at the magnified playback size of the content.

DETAILED DESCRIPTION

The present disclosure in some embodiments seeks to provide a content playback apparatus which is displaying a plurality of contents on a limited screen.

The present disclosure can be modified in various ways and practiced with many embodiments. Hereinafter, some embodiments of the present disclosure will be described in detail with reference to the drawings. However, the present disclosure is not limited to the disclosed embodiments and it is to be understood that modifications, equivalents and substitutes thereof may be made and fall within the scope of the invention set forth in the claims.

In the present disclosure, the phase of "transmitting a signal from one element to another" refers to not only transmitting the signal through direction connection from the one element to the another element but also transmitting the signal via still another element between the one element and the another element, unless stated otherwise.

Figure 1:
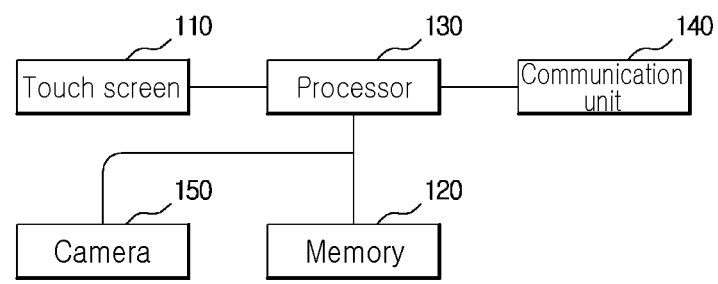
FIG. 1 is an exemplary block diagram illustrating a content playback apparatus according to at least one embodiment of the present disclosure.

FIG. 1 is an exemplary block diagram illustrating a content playback apparatus according to at least one embodiment of the present disclosure.

Referring to FIG. 1, a content playback apparatus includes a touch screen 110, a memory 120, a processor 130, a communication unit 140 and a camera 150.

The touch screen 110 displays images received from the processor 130. The touch screen 110 can receive a touch input from a user through a finger or pen which touches on the touch screen 110, and can generate input information based on the received touch input. In this case, the touch input includes an input from the user which touches on the touch screen 110, an input of release of the finger or pen from the touch screen, a dragging of movement of the finger or pen on the touch screen 110 in touch with touch screen 100, and a touch pressure. The input information is information indicating the above-mentioned inputs. The touch screen 110 transmits the input information to the processor 130.

The memory 120 stores a plurality of contents and a program including a user interface and instructions for playbacks of the contents.

The processor 130 generates an image such as a content to be played back through the user interface, according to an instruction stored in the memory 120, and transmits it to the touch screen 110. A process of the processor 130 to generate the image through the user interface and display the image on the touch screen 110 is obvious to those skilled in the art and, therefore, explanation of which is omitted for the purpose of brevity. The user interface includes a thumbnail image display area in which contents being played back are displayed as thumbnail images, and a main area in which contents are displayed at positions and sizes set by the user. For example, the main area is the entire area of the touch screen 110 including the thumbnail image display area. In this case, when the user touches one of the contents displayed as the thumbnail images, drags it into the main area, and holds the touching, the processor 130 magnifies the content depending on a touch hold time. Accordingly, the content playback apparatus makes it possible for a user to easily adjust a position and size at which a content is played back, through a touch input. A process of adjusting a position and size at which a content is played back through the user interface will be described in detail later with reference to FIGS. 2 and 3.

The processor 130 also generates a transmission image to be transmitted to another device through the communication unit 140. For example, the processor 130 can generate a transmission image (a first content) to be played back on the entire screen. The processor 130 transmits the transmission image to another device through the communication unit 140. In this case, another device is a mobile device or a device such as a television which is connected to the communication unit 140 via a predetermined communication protocol and receives and displays the transmission image.

The communication unit 140 is connected to another device and transmits a transmission image. In addition, the communication unit 140 receives a content from another device and transmit it to the processor 130. In this case, the processor 130 stores the content in the memory 120 and displays it on the touch screen 110 directly according to a playback instruction through the user interface. In addition, the communication unit 140 includes a plurality of communication modules of schemes.

The camera 150 takes an image of external environments to generate a content. The camera 150 transmits the generated content to the processor 130. The processor 130 stores the content in the memory 120 and plays back it. In addition, the processor 130 displays the content generated by the camera 150 on the touch screen 110 directly through the user interface.

Figure 2:
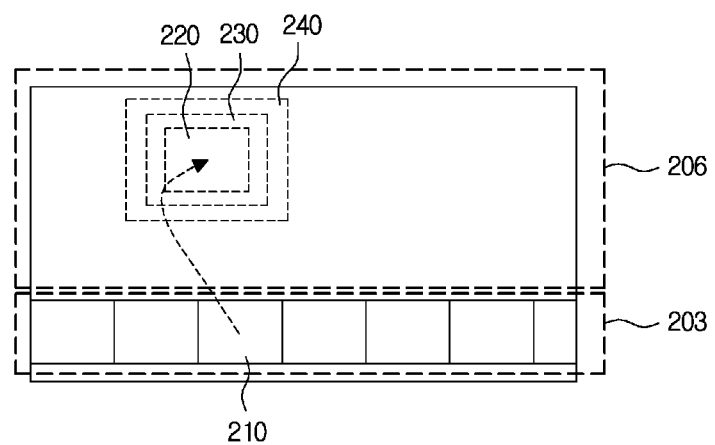
FIG. 2 is an exemplary view showing a screen on which a plurality of contents is played back through a user interface by a content playback apparatus, in accordance with a first embodiment of the present disclosure.

FIG. 2 is an exemplary view showing a screen on which a plurality of contents is played back through a user interface by a content playback apparatus, in accordance with at least one embodiment of the present disclosure.

Referring to FIG. 2, the user interface includes a thumbnail image display area 203 and a main area 206. In this case, the main area 206 becomes the entire area of the touch screen 110 including the thumbnail image display area 203. That is, the entire thumbnail image display area 203 or a background area is used as the main area in which contents are displayed.

At this time, a plurality of contents is played back as thumbnail images in the thumbnail image display area 203. When the processor 130 receives an input of touching one of the contents and dragging it to a point in the main area 206 from a user, the processor 130 moves the content to the point. If the dragging by the user is finished (or stopped) but the touch input is maintained, i.e., a finger or pen with which the user performed the dragging, remains in touch with the content, the processor 130 magnifies the size of the content with a predetermined magnification in every predetermined unit time until the touch is ended. For example, after moving a content (e.g., a thumbnail image 210) to a point 220 according to an input from the user, the processor 130 magnifies the thumbnail image 210 to a size indicated by reference numeral 230 for a touch hold time. If the touch input from the user still remains maintained, the processor 130 magnifies the content 210 to a size indicated by reference numeral 240. When the touch input from the user is terminated, the processor 130 ceases to change the size of the content 210. Therefore, the content playback apparatus can set positions and sizes at which contents displayed as thumbnail images are played back, according to touch, drag and touch release inputs from a user. Therefore, even when it is a device, such as a mobile device, having a small screen, the content playback apparatus allows a user to set positions and sizes at which contents are played back, without a small button which is hard to be pressed. Thus, if the user wishes to display a plurality of contents on the main area 206, the user can cause the content playback apparatus to play back and display the plurality of contents through user inputs including touch, drag and touch release for thumbnail images.

Although it has been illustrated that the sizes at which the above-described contents are determined depending on the touch input hold time, the sizes are determined according to a touch pressure by a user depending on an implementation method.

For example, the processor 130 magnifies a playback size at which a content is played back, with increase in a touch pressure. Therefore, a user adjusts the playback size without waiting magnification of the size after drag termination. In addition, if a pressure according to a touch pressure exceeds a predetermined value, the processor 130 gradually magnifies the playback size at which the content is played back. Therefore, even when the user stops the dragging for a minute in order to designate a position at which the content is played back, the size at which the content is played back, and further, even when the user stops the dragging for a minute in order to grasp a position at which the content is played back, it is possible to prevent the processor 130 from entering a process of adjusting the size at which the content is played back.

Figure 3:
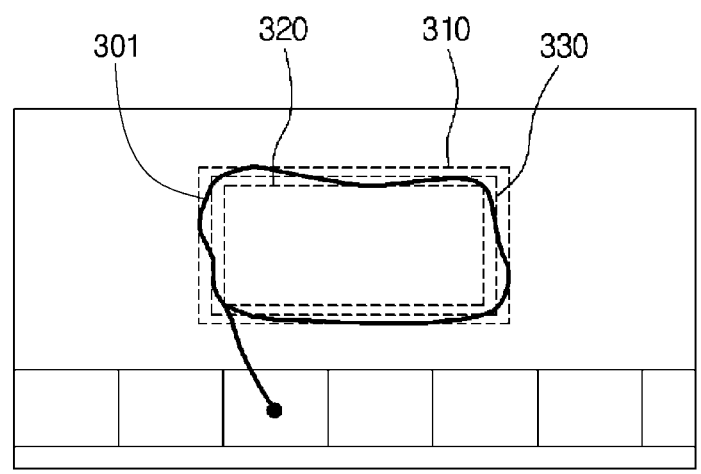
FIG. 3 is an exemplary view showing a screen on which a plurality of contents is played back through a user interface by a content playback apparatus, in accordance with a second embodiment of the present disclosure.

FIG. 3 is an exemplary view showing a screen on which a plurality of contents is played back through a user interface by a content playback apparatus, in accordance with at least one embodiment of the present disclosure.

Referring to FIG. 3, the user interface includes a thumbnail image display area 203 and a main area 206.

In this case, a plurality of contents is played back as thumbnail images in the thumbnail image display area 203. When the processor 130 receives an input of touching one 210 of the contents and dragging it into the main area 206 from a user, the processor 130 displays a path according to the dragging, as a line (hereinafter referred to as a path line). Thereafter, when path lines according to the dragging form a closed FIG. 301, the processor sets a playback size at which a content is played back, to a size of a rectangle 310 circumscribing the closed FIG. 301 formed by the path lines, and displays the content at a position of the rectangle.

Depending on an implementation method, the processor 130 displays the content at a playback size and position according to a rectangle 320 inscribing the figure formed by the single closed curve. Alternatively, the processor 130 sets a playback size of the content and position according to a rectangle 330 formed by a set of points having the same distance from matched sides when sides of the rectangle 310 circumscribing the figure formed by the single closed curve match in one-to-one correspondence with sides of the rectangle 320 inscribing the figure formed by the single closed curve. For example, the processor 130 matches the upper side of the rectangle 310 circumscribing the figure with the upper side of the rectangle 320 inscribing the figure and calculate points having the same distance from the upper sides. In addition, the processor 130 calculates points having the same distance for left sides, right sides and lower sides of the rectangle 310 and rectangle 320, according to the above-described process. The processor 130 sets playback sizes and positions of contents through the rectangle 330 formed by the same distance points.

Accordingly, the content playback apparatus according to the at least one embodiment of the present disclosure sets playback sizes and positions at which contents are displayed, through a dragging from a user.

The contents played back and displayed according to the above-described methods (FIGS. 2 and 3) of the present disclosure are changed in playback size and position or changed in playback size at the same position through the user inputs including the touch, dragging and touch release, in the same way.

Figure 4:
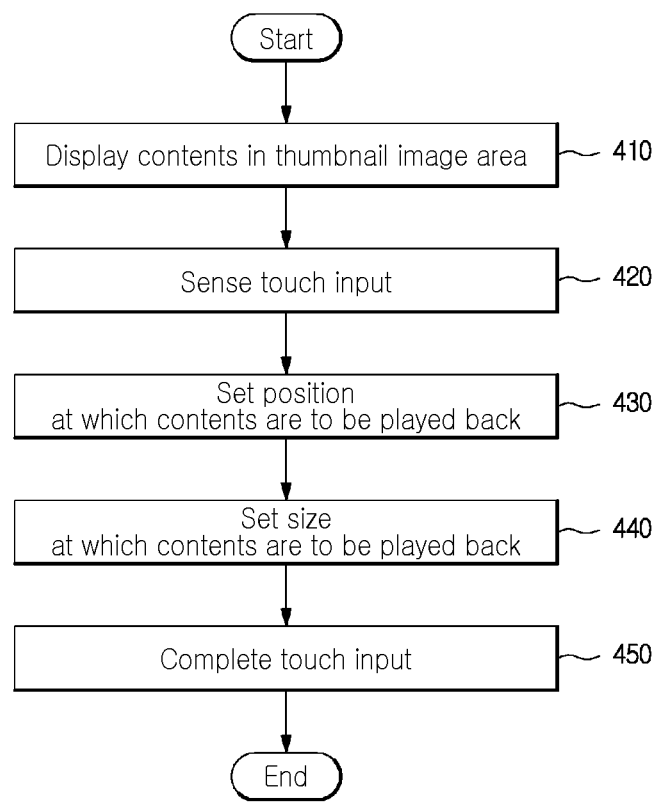
FIG. 4 is an exemplary flow chart illustrating a process of the content playback apparatus to play back the contents, in accordance with at least one embodiment of the present disclosure.

FIG. 4 is an exemplary flow chart illustrating a process of the content playback apparatus to play back the contents, in accordance with at least one embodiment of the present disclosure. The following process is a process performed by functional units included in the content playback apparatus. However, for the purpose of brevity of description, the description will be given with the content playback apparatus as a subject.

Referring to FIG. 4, at Step 410, the content playback apparatus displays a plurality of contents in the thumbnail image area 203. For example, the contents are contents received from an external device through the communication unit 140, contents generated by the camera 150, and the like.

At Step 420, the contents playback apparatus senses a touch input on the touch screen 110 from a user. In this case, the touch input comprises inputs, such as touch, drag and touch release, from the user.

At Step 430, the content playback apparatus sets a position at which a content corresponding to a thumbnail image first touched by the user is played back. For example, the content playback apparatus moves the content positioned at the point first touched by the user, according to a dragging. When the dragging is stopped (i.e., a finger or pen that performed the dragging pauses while remaining in a touched state with the touch screen), the content playback apparatus sets the point at which the dragging is stopped, to a position at which the content is to be played back.

At Step 440, the content playback apparatus sets a playback size at which the content is to be played back, according to the touch input. For example, the content playback apparatus magnifies the playback size of the content for a touch hold time after the dragging is stopped, ceases to magnify the content size if the touch release occurs during the magnification of the content size, and sets the magnified size of the thumbnail image to a size at which the content is to be played back.

Although it has been illustrated that the size at which the content is to be played back is set depending on a touch hold time at Step 440, conditions of setting the playback size at which the content is to be displayed may be changed depending on an implementation method.

For example, the content playback apparatus changes the playback size of the content in proportion to a pressure according to the touch input at Step 440. Alternatively, if the touch pressure exceeds a predetermined value, the content playback apparatus sequentially changes the size at which the content is to be displayed, by a predetermined magnification in a predetermined unit of time.

In addition, Step 440 is changed to a step in which the content playback apparatus sets a size and position at which the content is to be played back using a path line formed by the user dragging, as described above with reference to FIG. 3.

When the touch input is completed at Step 450, the content playback apparatus completes the control for playback of the content and plays back the contents according to the control.

If the plurality of contents are already being played back in the main area, only Steps 420, 430, 440 and 450 except Step 410 in the flow chart of FIG. 4 are performed in order to change the sizes and positions at which the contents are being played back. That is, the contents being already played back are changed in position and size by sensing a touch input to select a content to be changed in position and playback size, among the contents being already played back, at Step 420, setting a playback position at Step 430, setting a playback size at Step 440, and completing the touch input at Step 450. In addition, if only the playback sizes of the contents being already played back are intended to be adjusted, the contents can be changed in a playback size by sensing a touch input to select a content to be changed in a playback size, among the contents being already played back, at Step 420, setting a playback size at Step 440 in the above-described way if a touch input for playback size setting is sensed without a position change input for Step 430, for example, if a touch lasts for a certain time or a touch pressure is sensed to exceed a predetermined value without any dragging after the touch input at Step 420, and completing the touch input at Step 450.

While the present disclosure has been particularly shown and described with reference to exemplary embodiments thereof, it will be understood by those skilled in the art that various changes in form and details may be made therein without departing from the spirit and scope of the present disclosure as defined by the appended claims and equivalents thereof.

As described above, the present disclosure provides a device including a touch screen, which is capable of allowing a user to easily arrange and display a plurality of contents on a screen according to intention of the user.

In addition, the present disclosure controls playback of contents shared by means of a content playback apparatus through an external device.

What is claimed is:
1. A content playback apparatus, comprising:
 a touch screen configured to
  play back a plurality of contents, and
  detect a touch input for the contents;
 a memory configured to store the plurality of contents and instructions to control a playback of the plurality of contents; and
 a processor configured to control the playback of the contents according to the instructions,
 wherein the instructions include
  a display instruction for displaying playbacks of the plurality of contents,
  a move instruction for moving, among the plurality of contents, a content according to the touch input, and
  a magnification instruction for, in response to said moving, magnifying a playback size of the moved content according to the touch input and displaying a playback of the content on the touch screen at the magnified playback size of the content, wherein the processor is configured to display the plurality of contents in a predetermined size on the touch screen, and wherein when a path line according to a dragging of the touch input forms a closed figure, the processor is configured to magnify the playback size of the content corresponding to the closed figure, and display the playback of the content at a position corresponding to the closed figure and at the magnified playback size of the content.

2. The content playback apparatus according to claim 1, wherein the processor is configured to, when the dragging of the touch input is stopped, sequentially magnify the playback size of the content with a predetermined magnification ratio in a predetermined unit of time while the touch input is maintained.

3. The content playback apparatus according to claim 1, wherein the processor is configured to, when the dragging of the touch input is stopped, magnify the playback size of the content depending on a touch pressure of the touch input.

4. The content playback apparatus according to claim 3, wherein the processor is configured to magnify the playback size of the content in proportion to the touch pressure of the touch input.

5. The content playback apparatus according to claim 3, wherein the processor is configured to magnify the playback size of the content with a predetermined magnification ratio in a predetermined unit of time while the touch pressure is held at a predetermined value or higher.

6. The content playback apparatus according to claim 1, wherein the processor is configured to display the playback of the content at the position according to one of a plurality of rectangles circumscribing and inscribing the closed figure.

7. A method of playing back content, the method performed by a content playback apparatus comprising a processor and a touch screen, the method comprising:

displaying playbacks of a plurality of contents in a predetermined size on the touch screen;

moving, among the plurality of contents, a content according to a dragging of a touch input;

magnifying a playback size of the moved content according to the touch input; and displaying a playback of the magnified content on the touch screen at the magnified playback size of the content, wherein when a path line according to the dragging of the touch input forms a closed figure, the processor magnifies the playback size of the content corresponding to the closed figure, and displays the playback of the content at a position corresponding to the closed figure and at the magnified playback size of the content.

8. The method according to claim 7, wherein when the dragging of the touch input is stopped, the processor sequentially magnifies the playback size of the content with a predetermined magnification ratio in a predetermined unit of time while retaining the touch input, and wherein when the touch input is terminated, the processor displays the playback of the content on the touch screen at the magnified playback size of the content.

9. The method according to claim 7, wherein when the dragging of the touch input is stopped, the processor magnifies the playback size of the content depending on a touch pressure of the touch input, and wherein when the touch input is terminated, the the processor displays the playback of the content on the touch screen at the magnified playback size of the content.

10. The method according to claim 9, wherein the processor magnifies the playback size of the content in proportion to the touch pressure of the touch input.

11. The method according to claim 9, wherein the processor magnifies the playback size of the content with a predetermined magnification ratio in a predetermined unit of time while the touch pressure is held at a predetermined value or higher.

12. The content playback method according to claim 7, wherein the processor displays the playback of the content at a position according to one of a plurality of rectangles circumscribing and inscribing the closed figure.

* * * * *